(12) United States Patent
Dickens

(10) Patent No.: US 6,427,953 B1
(45) Date of Patent: Aug. 6, 2002

(54) CABLE SUPPORTING APPARATUS

(75) Inventor: James E. Dickens, Ocoee, FL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/887,275

(22) Filed: Jun. 22, 2001

(51) Int. Cl.[7] .................................................. F16L 3/22
(52) U.S. Cl. ....................... 248/68.1; 248/71; 248/74.1; 248/909; 174/135
(58) Field of Search ..................... 248/68.1, 69, 71, 248/74.1, 909; 174/135

(56) References Cited

U.S. PATENT DOCUMENTS

| | | | | |
|---|---|---|---|---|
| 429,357 A | * | 6/1890 | McBee | 248/68.1 |
| 566,544 A | * | 8/1896 | Smith | 248/68.1 |
| 792,594 A | * | 6/1905 | Hiss | 248/69 |
| 1,151,380 A | * | 8/1915 | Ogden | 248/69 |
| 1,308,869 A | * | 7/1919 | Rohmer | 24/343 |
| 2,003,159 A | * | 5/1935 | Taylor | 248/62 |
| 3,363,864 A | * | 1/1968 | Olgreen | 248/68.1 |
| 3,861,015 A | * | 1/1975 | Hooven | 174/72 A |
| 4,093,761 A | * | 6/1978 | Taylor | 174/72 A |
| 5,181,680 A | * | 1/1993 | Coll | 248/542 |
| 5,743,497 A | * | 4/1998 | Michael | 248/316.7 |
| D394,997 S | * | 6/1998 | Coll | D8/356 |
| 5,772,160 A | * | 6/1998 | Gordon | 248/316.1 |
| 5,897,082 A | * | 4/1999 | Losada | 248/65 |
| 5,908,179 A | * | 6/1999 | Fimbres | 160/10 |

* cited by examiner

Primary Examiner—Dean A. Reichard
Assistant Examiner—Adolfo Nino
(74) Attorney, Agent, or Firm—Kirkpatrick & Lockhart LLP

(57) ABSTRACT

A cable support apparatus. In one embodiment, the cable support apparatus includes a body portion that has a first cable retainer at one end and a second cable retainer at another end. In another embodiment, third and fourth cable retainers are on the body of the apparatus and serve to support a third cable in a desired orientation.

13 Claims, 6 Drawing Sheets

CABLE SUPPORTING APPARATUS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The subject invention relates to cable supporting apparatuses and, more particularly, to apparatuses for supporting one or more cables in desired locations and/or orientations.

2. Description of the Invention Background

Each day, perhaps millions of miles of cables and wires transport a variety of electronic and other signals to various types of equipment. For example, in the telecommunications industry, cables and wires are used to transmit signals etc. to operate telephones, computers, televisions, etc. In applications where moisture is prevalent, such as when running cables from the exterior to the interior of a dwelling, it is desirable to support the wire cables etc. such that a loop is formed below where the wire enters through the wall. This loop permits moisture that collects on the cable to run down the cable and drip off of the loop. The loop, commonly referred to as a "drip loop" prevents the moisture from following the wire into the dwelling or piece of equipment to which it is attached.

To fashion such "drip loops" the installer often just provides some extra slack in the cable below where it enters the dwelling. Such approach leads to the formation of inconsistent and often inadequate drip loops and, when exposed to wind, etc., the cable may be tossed back and forth along the dwelling wall until the drip loop either no longer exists or no longer has an optimum shape and/or orientation.

Thus, there is a need for a cable support apparatus that is easy to install and that can be used to establish uniform drip loops in one or more cables.

There is a further need for a cable support apparatus that offers the above-mentioned advantages and that is relatively inexpensive to manufacture.

SUMMARY OF THE INVENTION

In accordance with one form of the present invention there is provided a cable supporting apparatus that includes a body portion, a first cable retainer on one end of the body portion and a second cable retainer on another end of the body portion.

Another embodiment of the present invention comprises a cable supporting apparatus that includes a first cable retaining means, a second cable retaining means interconnected in spaced-apart relation to the first cable retaining means, and means for attaching the first and second cable means to an object or structure.

Yet another embodiment of the present invention comprises a cable supporting apparatus that includes a body that has an intermediate portion and two end portions. A first cable retainer is on one end of the body portion and a second cable retainer is on another end of the body portion. A third cable retainer is attached to the intermediate portion of the body.

An embodiment of the present invention may comprise a cable supporting apparatus that includes an elongated body and at least two cable retainers integrally formed in the body in spaced-apart relationship to each other.

Yet another embodiment of the present invention may include a method of manufacturing a cable supporting apparatus that includes forming a first cable retainer on an end of a body member and forming a second cable retainer on another end of the body member.

Still another embodiment of the present invention may include a method of forming a drip loop in a cable that includes providing a bracket that has a first cable retainer and a second cable retainer spaced from the first cable retainer. This embodiment further includes placing a first portion of the cable in the first cable retainer and placing a second portion of the cable in the second cable retainer such that a third portion of cable remains between the first and second cable portions and extends therebelow. The method further includes forming an arc in the third portion extending below the first and second cable portions.

Yet another embodiment of the present invention may comprise a method of forming a drip loop in a cable suspended by a structure that includes trapping a first portion of the cable between a portion of a bracket and the structure and trapping a second portion of the cable between another portion of the bracket and the structure such that a third portion of cable extends between the trapped first cable portion and the trapped second cable portion. This embodiment further includes forming an arc in the third portion of cable extending between the trapped first cable portion and the trapped second cable portion.

Another embodiment of the present invention may comprise a method of forming drip loops in cables suspended adjacent a structure that includes trapping first portions of at least two cables between a portion of a bracket and the structure and trapping a second portion of the at least two cables between another portion of the bracket and the structure such that third portions of each cable extend between the trapped first portions and the trapped second portions. This embodiment also includes forming an arc in each of the third portions of cables.

It is a feature of the present invention to provide a cable support apparatus that is relatively inexpensive to manufacture and easy to install.

It is another feature of the present invention is to provide a cable support apparatus that can support one or more cables in desired orientations.

Another feature of the present invention is to provide a cable support apparatus that can support one or more cables while retaining a drip loop therein.

Accordingly, the present invention provides solutions to the problems associated with many different types of cable installations. Those of ordinary skill in the art will readily appreciate, however, that these and other details, features and advantages will become further apparent as the following detailed description of the embodiments proceeds.

BRIEF DESCRIPTION OF THE DRAWINGS

In the accompanying Figures, there are shown present embodiments of the invention wherein like reference numerals are employed to designate like parts and wherein.

DETAILED DESCRIPTION OF THE EMBODIMENTS OF THE INVENTION

Figure 1:
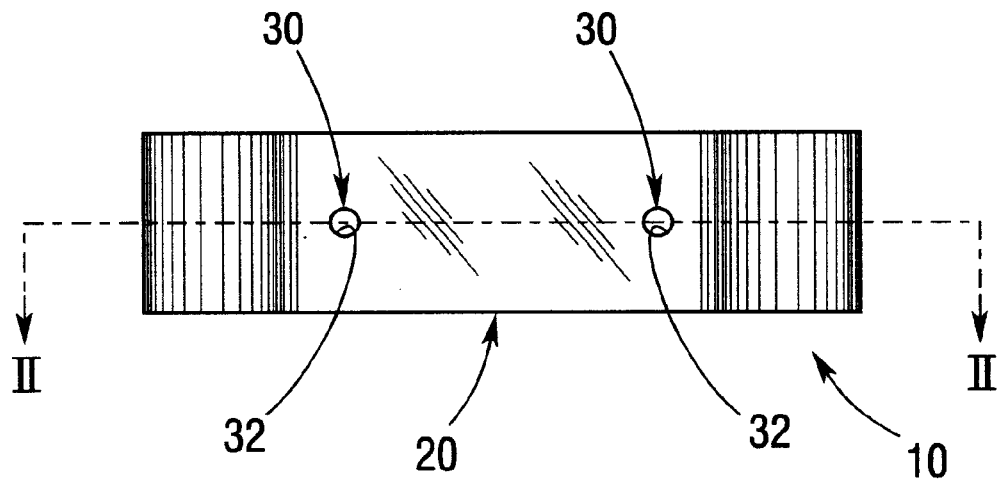
FIG. 1 is a front view of one embodiment of the cable support apparatus of the present invention.

Referring now to the drawings for the purposes of illustrating the present preferred embodiments of the invention only and not for the purposes of limiting the same, FIGS. 1–4 illustrate one embodiment of the cable support apparatus 10 of the present invention supporting a pair of flexible cables (12, 14) therein. As used herein, the term "cable" may refer to a wire or cable that may carry or conduct a signal. The term "cable" should not be limited to the type of signal that it carries, be it electronic, optical voice, etc. As the present Detailed Description proceeds, the reader will appreciate that the various embodiments may be found particularly useful for supporting mediums that are sufficiently flexible to permit an arc or drip loop to be formed therein. Accordingly, the protection afforded to the various embodiments of the present invention claimed herein should not be limited to use with a particular type of cable, wire, etc.

Figure 2:
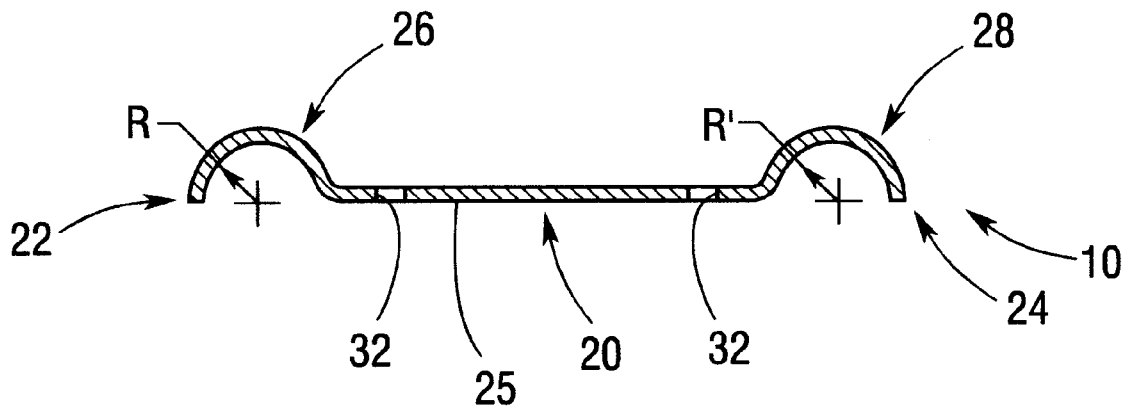
FIG. 2 is a cross-sectional view of the cable support apparatus of FIG. 1, taken along line II—II in FIG. 1.

In the embodiment of FIGS. 1 and 2, the cable support apparatus 10 includes a body portion 20 that has a first end 22, a second end 24, and an intermediate portion 25. A first cable retainer 26 is attached to or formed on the first end 22 and a second cable retainer 28 is attached to or formed on the second end 24 of the body portion 20. In one embodiment, the cable support apparatus 10 is fabricated from a metallic metal such as, for example, stainless steel strapping or galvanized steel strapping, etc. Those of ordinary skill in the art will also appreciate that the cable support apparatus may also be fabricated from a polymeric material, aluminum, painted steel, etc. In the embodiment depicted in FIGS. 1 and 2, the first cable retainer 26 and the second cable retainer 28 are integrally formed with the intermediate portion 25 of the body portion 25.

The first cable retainer 26 and the second cable retainer 28 may be each provided with a shape that is complementary to the shapes of the cables to be supported In the embodiment depicted in FIGS. 1 and 2, the first cable retainer 26 and the second cable retainer 28 are arcuate in shape. Such arcuate shapes may comprise a semicircle or they may be less than a semicircle if desired. Those of ordinary skill in the art will appreciate that the inside radius of the first cable retainer 26 (designated as "R" in FIG. 2) and the inside radius of the second cable retainer 28 (designated as "R'" in FIG. 2) may be sized to accommodate one or more cables in the manners described below. It will be further appreciated that, when the cable support apparatus 10 is employed to form drip loops in one or more cables, it may be advantageous to form the inside radius "R'" such that it is equal to the inside radius "R". It will also be appreciated that the cable retainers (26, 28 may be formed in a variety of different shapes such as, for example, square shaped or "V"-shaped.

Figure 3:
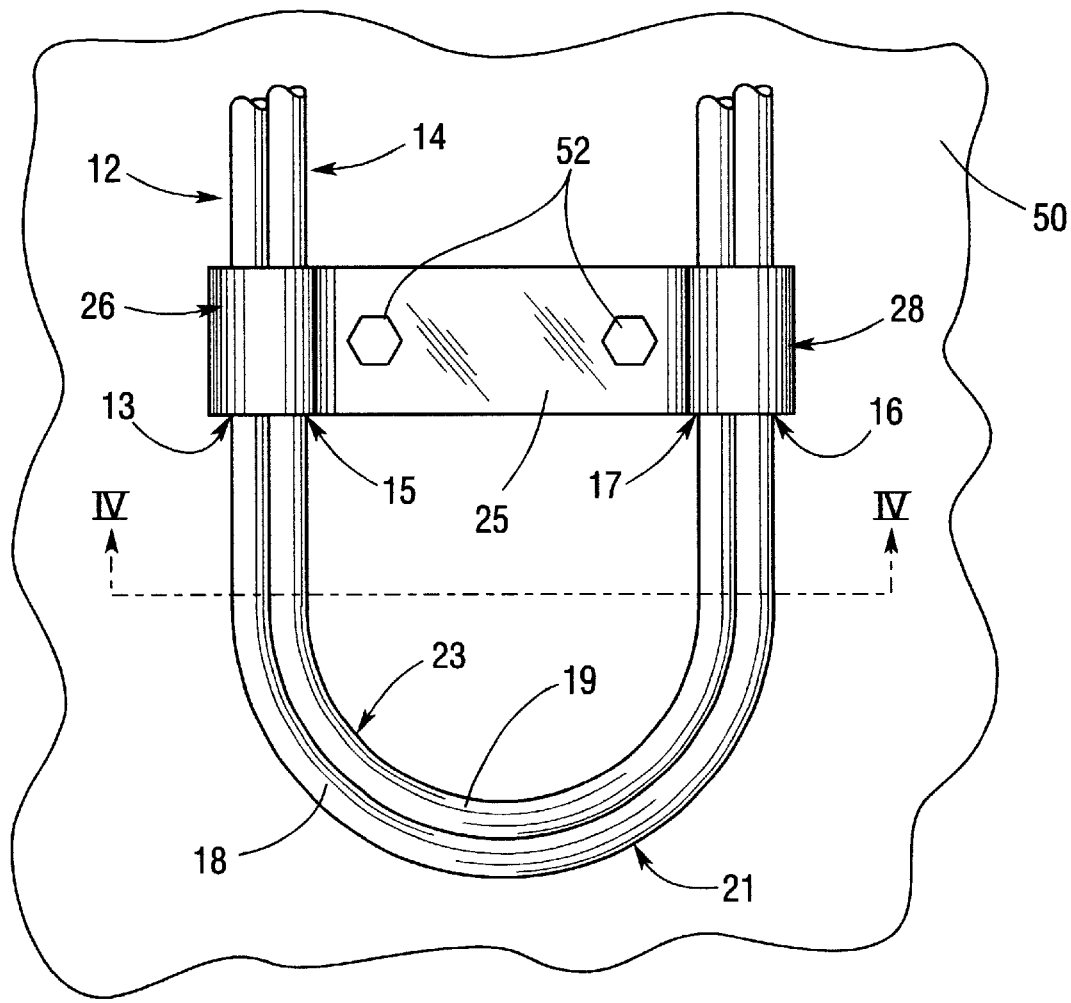
FIG. 3 is a front view of the cable support apparatus of FIGS. 1 and 2 attached to a portion of a structure and supporting two cables therein.
Figure 4:
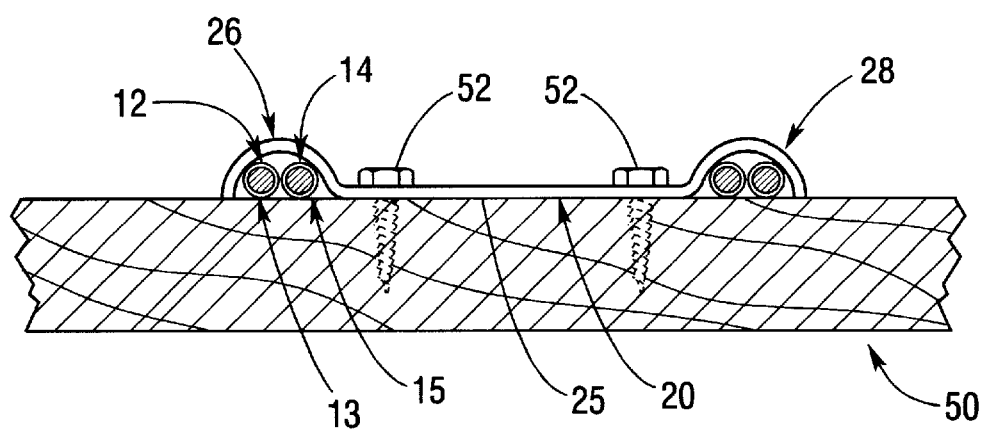
FIG. 4 is top view of the cable support apparatus and cables of FIG. 3.

To facilitate attachment of the cable support apparatus 10 to a structure such as a dwelling wall 50 as illustrated in FIGS. 3 and 4, the cable support apparatus 10 may be provided with one or more attachment means 30. In the embodiment depicted in FIGS. 1–4, the attachment means comprises at least one, and more preferably two or more holes 32 through the body portion 20. As can be seen in FIGS. 3 and 4, the holes 32 accommodate fasteners 52, such as wood screws, bolts, concrete anchors, etc. that are compatible with the particular structure 50.

One method of using the cable support apparatus 10 will now be described with reference to FIGS. 3 and 4. As can be seen in those Figures, first portions (13, 15) of cables (12, 14),respectively are located in the first cable retainer 26. Second portions (16, 17) of the cables (12, 14), respectively are located in the second cable retainer 28 such that third portions (18, 19) of the cables (12, 14), respectively are permitted to droop between the first and second cable retainers (26, 28) and be formed with a desired arc (designated generally as 21, 23). The cable supporting apparatus 10 is then attached to the structure 50 with appropriate fasteners. In the embodiment depicted in FIGS. 3 and 4, wood screws are inserted through the holes in the body portion and into the structure 50. As described above, FIGS. 3 and 4 depict the use of the cable support apparatus 10 for supporting two cables. Those of ordinary skill in the art will appreciate, however, that the cable support apparatus 10 may be easily fabricated to support one cable or a plurality of cables (two or more) without departing from the spirit and scope of the various embodiments of the present invention.

Figure 5:
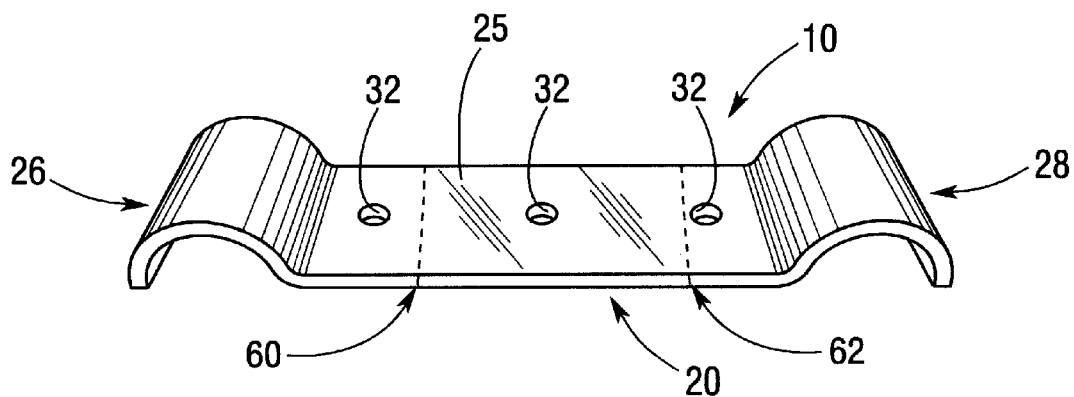
FIG. 5 is perspective view of another embodiment of the cable support apparatus of the present invention.
Figure 6:
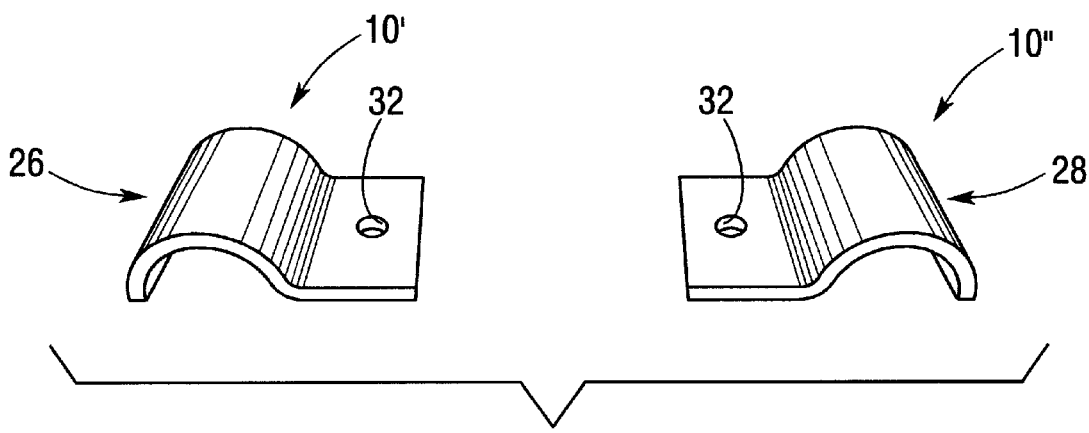
FIG. 6 is a perspective view of cable brackets separated from the body portion of the cable support apparatus of FIG. 5 along the first and second score lines.

Another embodiment of the cable support apparatus 10 of the present invention is illustrated in FIG. 5. As can be seen in that Figures, the cable support apparatus 10 has an elongated intermediate body portion 25 that has three fastener holes 32 therethrough. In addition, the intermediate body portion 25 may be provided with a first score line 60 that enables the first retainer portion 28 and a portion of the body with a hole 32 therethrough to be separated from the remaining portion of the apparatus 10 to form a single bracket 10'. Similarly, a second score line 62 may be provided in the intermediate body portion 25 which enables the second cable retainer and a portion of the body 20 containing a hole 32 to be separated from the remaining portion of the apparatus 10 to form a bracket generally designated as 10". It will be understood that the score lines (60, 62) comprise weakened areas in the body portion 20 that permit the installer to snap or otherwise break off the first cable retainer 26 or the second cable retainer 28 from the remainder of the cable support apparatus 10. FIG. 6 illustrates a first cable bracket 10' and a second cable bracket 10".

Figure 7:
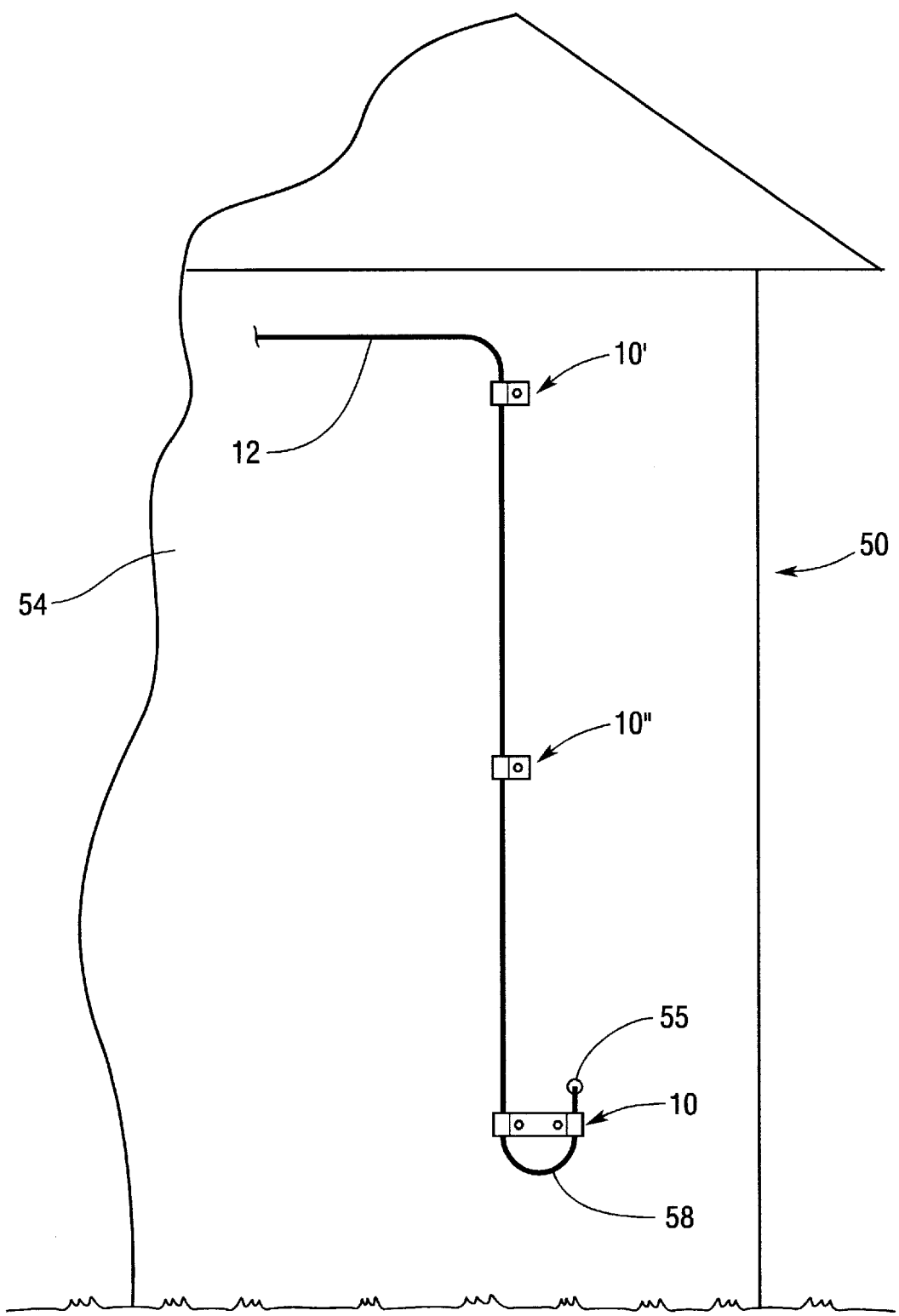
FIG. 7 is a partial elevational view of a cable attached to an exterior wall of a structure with the cable supporting apparatus and brackets of the present invention.

FIG. 7 illustrates the use of a cable support apparatus 10 and the brackets 10' and 10". As can be seen in that Figure, the structure 50 comprises a dwelling that has a wall 54. A single cable 12 is initially ran along the upper portion of the wall 54 along the exterior thereof. At a desired point, a portion of the cable 12 is ran down the exterior side of the wall 54. A first bracket 10' and a second bracket 10" are used to affix the upper portion of the cable 12 to the wall 54. A bracket 10 is installed in the above-described manner, adjacent and below an opening 55 in the wall 54 through which the cable 12 enters the structure 50. The bracket 10 is used to form a drip loop or arc 58 in the cable 12 as shown.

FIGS. 8–11 illustrate another embodiment of the present invention that is somewhat similar to the cable support apparatus 10, except for the differences discussed below. In this embodiment, the cable support apparatus 110 includes a body portion 120 that has a first cable retainer 126 formed on one end and a second cable retainer 128 formed on the other end with an intermediate portion 125 extending therebetween. The first and second cable retainers 126 and 128 may be similar to the cable retainers 26 and 28 as described above. However, in this embodiment, a third cable retainer 170 and a fourth cable retainer 180 are attached to or formed from an intermediate portion 125 of the body portion 120. The reader will appreciate that for applications wherein it is not necessary to form a drip loop in a third cable, the body portion may only have a third cable retainer formed therein.

Figure 8:
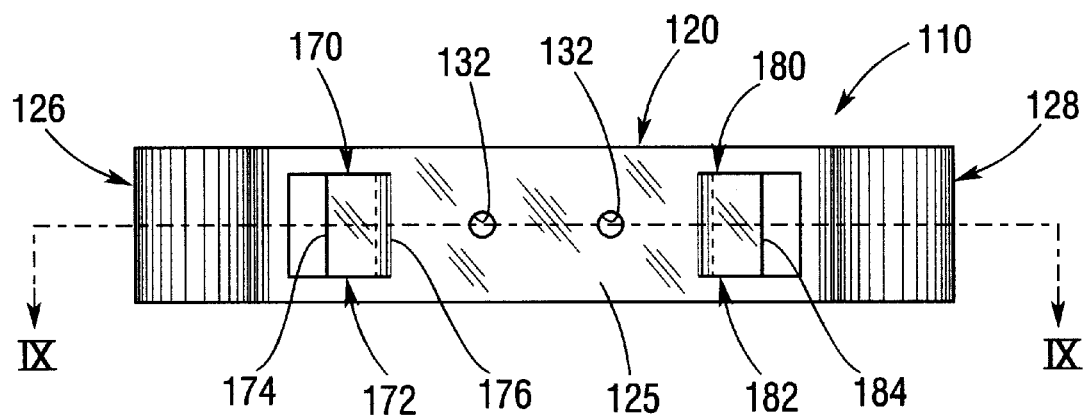
FIG. 8 is a front view of another cable support apparatus of the present invention.
Figure 9:
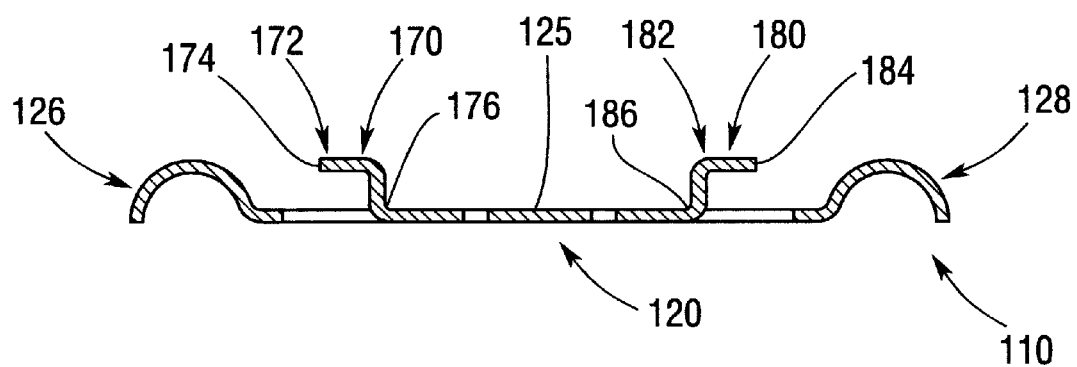
FIG. 9 is a cross-sectional view of the cable support apparatus of FIG. 8 taken along line IX—IX in FIG. 8.

More specifically and with reference to FIGS. 8 and 9, the third cable retainer 170 and the fourth cable retainer 180 are integrally formed from the intermediate portion 125 of the body portion 120. In this embodiment, for example, the third cable retainer 170 comprises a three-sided flap 172 that is punched from the intermediate portion 125 of the body portion 120. The flap 172 has a free end 174 that is detached from the intermediate portion and another end 176 that remains attached to the intermediate portion 125. The flap 172 is formed such that the free end 174 is spaced-apart from the intermediate portion 125 to permit a portion of a cable to be retained between the free end 174 of the flap 172 and the intermediate portion 125 of the body 120.

Similarly in this embodiment, the fourth cable retainer 180 comprises a three-sided flap 182 that is punched from the intermediate portion 125 of the body portion 120. The flap 182 has a free end 184 that is detached from the intermediate portion and another end 186 that remains attached to the intermediate portion 125. The flap 182 is formed such that the free end 184 is spaced-apart from the intermediate portion 125 to permit a portion of a cable to be retained between the free end 184 and the intermediate portion 125.

Figure 10:
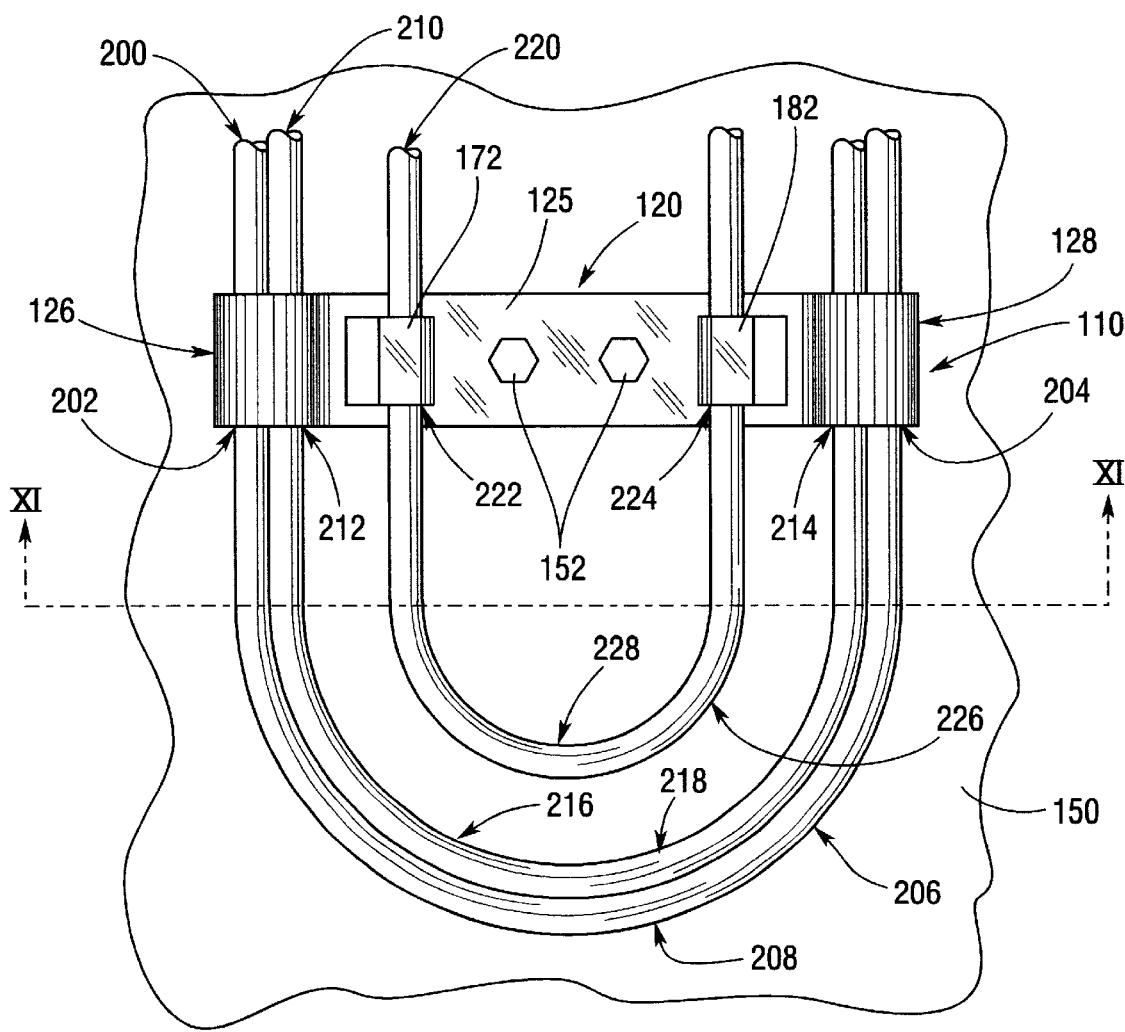
FIG. 10 is a front view of the cable support apparatus of FIGS. 8 and 9 attached to a portion of a structure and supporting three cables therein.
Figure 11:
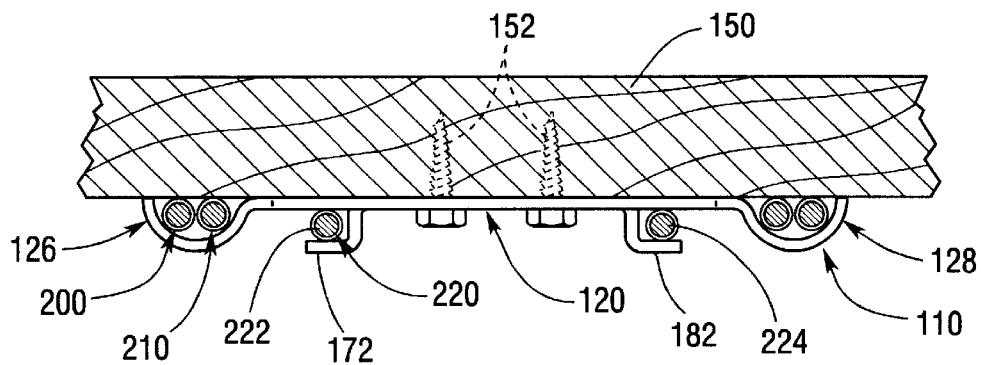
FIG. 11 is a top view of the cable support apparatus, cables and structure depicted in FIG. 10.

One method of using the cable support apparatus 110 to support cables (200, 210, 220) will now be described with reference to FIGS. 10 and 11. As can be seen in those Figures, first portions (202, 212) of cables (200, 210), respectively are located in the first cable retainer 126. Second portions (204, 214) of the cables (200, 210), respectively are located in the second cable retainer 128 such that third portions (206, 216) of the cables (200, 210), respectively are permitted to droop between the first and second cable retainers (126, 128) and be formed with a desired arc (designated generally as 208, 218). The cable supporting apparatus 110 is then attached to the structure 150 with appropriate fasteners. In the embodiment depicted in FIGS. 10 and 11, wood screws 152 are inserted through the holes 132 in the body portion 120 and into the structure 150.

After the cable support apparatus 110 has been installed, a third cable 220 may also be supported by the apparatus 110. In particular, a first portion 222 of the third cable 220 is placed between the free end 172 of the third cable retainer 170. A second portion 224 of the third cable 220 is placed between the free end of the fourth cable retainer such that a third portion 226 of cable 220 is permitted to droop between the third and fourth cable retainers (170, 180) and be formed with a desired arc (designated generally as 228). Those of ordinary skill in the art will appreciate that the order of installing the cables may be reversed and that, if desired, the third cable 220 may be installed under the flaps (172, 182) prior to affixing the apparatus 110 to the structure 150. It will be further appreciated that the flaps ('72, 182) may be carefully biased into clamping engagement with the third cable 220 to retain it in position.

Thus, from the foregoing discussion it is apparent that the various embodiments of the present invention represent unique and novel methods of supporting cables, wires, etc. in orientations for advantageously forming drip loops therein. Those of ordinary skill in the art will, of course, appreciate that various changes in the details, materials and arrangement of parts which have been herein described and illustrated in order to explain the nature of the invention may be made by the skilled artisan within the principle and scope of the invention as expressed in the appended claims.

What is claimed is:

1. An apparatus for supporting a plurality of cables on a surface, said apparatus, comprising:

a body having an intermediate portion and two end portions, said body attached to the surface;

a first cable retainer on one end of said body for trapping at least one cable portion between said first cable retainer and the surface;

a second cable retainer on another end of said body for trapping at least one other cable portion between said second cable retainer and the surface; and a third cable retainer attached to said intermediate portion of said body for trapping at least one additional cable between said third retainer and said intermediate portion of said body.

2. The cable supporting apparatus of claim 1 wherein said first and second cable retainers are arcuate in shape.

3. The cable supporting apparatus of claim 2 wherein said first and second cable retainers are semicircular in shape.

4. The cable supporting apparatus of claim 1 wherein said first and second cable retainers are integrally formed with said body.

5. The cable supporting apparatus of claim 4 wherein said body is fabricated from a metallic material.

6. The cable supporting apparatus of claim 5 further comprising a first score line in said body.

7. The cable supporting apparatus of claim 6 wherein said first score line is located in said body such that said first cable retainer and a portion of said body containing at least one mounting hole may be separated from a remaining portion of said body at said score line.

8. The cable supporting apparatus of claim 7 further comprising a second score line in said remaining portion of said body such that said second cable retainer and a portion of said remaining body portion containing at east one other mounting hole may be separated from another portion of said remaining body portion.

9. The cable supporting apparatus of claim 1 wherein said third cable retainer is integrally formed in said intermediate portion of said body.

10. The cable supporting apparatus of claim 9 wherein said third cable retainer comprises a flap stamped into said intermediate portion such that said flap has a free end detached from said intermediate portion and another end attached to said intermediate portion, said flap formed such that said free end is spaced from said intermediate portion.

11. The cable supporting apparatus of claim 1 further comprising a fourth cable retainer attached to said intermediate portion of said body for trapping at least one additional cable between said third retainer and said intermediate portion of said body.

12. The cable supporting apparatus of claim 11 wherein said fourth cable retainer is integrally formed in said intermediate portion of said body.

13. The cable supporting apparatus of claim 12 wherein said third cable retainer comprises a third flap stamped into said intermediate portion such that said third flap has a free end detached from said intermediate portion and another end attached to said intermediate portion, said third flap formed such that said free end is spaced from said intermediate portion and wherein said fourth cable retainer comprises a fourth flap stamped into said intermediate portion such that said fourth flap has a free end detached from said intermediate portion and another end attached to said intermediate portion, said fourth flap formed such that said free end is spaced from said intermediate portion.

* * * * *